United States Patent
Negulescu et al.

(10) Patent No.: US 10,436,031 B2
(45) Date of Patent: Oct. 8, 2019

(54) COOLED TURBINE RUNNER, IN PARTICULAR FOR AN AIRCRAFT ENGINE

(71) Applicant: Rolls-Royce Deutschland Ltd & Co KG, Blankenfelde-Mahlow (DE)

(72) Inventors: Joana Negulescu, Berlin (DE); Jens Taege, Schoeneiche (DE); Dimitrie Negulescu, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 511 days.

(21) Appl. No.: 15/213,890

(22) Filed: Jul. 19, 2016

(65) Prior Publication Data

US 2017/0138200 A1 May 18, 2017

(30) Foreign Application Priority Data

Jul. 20, 2015 (DE) .......................... 10 2015 111 746

(51) Int. Cl.
  *F01D 5/08* (2006.01)
  *F01D 5/18* (2006.01)

(52) U.S. Cl.
  CPC .............. *F01D 5/081* (2013.01); *F01D 5/18* (2013.01); *F01D 5/188* (2013.01);
  (Continued)

(58) Field of Classification Search
  CPC . F01D 5/081; F01D 5/18; F01D 5/188; F01D 5/088; F01D 5/186; F01D 5/187;
  (Continued)

(56) References Cited

U.S. PATENT DOCUMENTS 2,657,008 A * 10/1953 Atkinson ................ F01D 5/028
  416/213 R
3,015,937 A *  1/1962 Giliberty .................. F01D 5/18
  415/116
(Continued)

FOREIGN PATENT DOCUMENTS

DE       1221497 B      7/1966
DE       2221895 A1    12/1972
(Continued)

OTHER PUBLICATIONS

European Search Report dated Dec. 1, 2016 for counterpart European Application No. 1617669.7.
(Continued)

*Primary Examiner* — Justin D Seabe
*Assistant Examiner* — Brian Christopher Delrue
(74) *Attorney, Agent, or Firm* — Shuttleworth & Ingersoll, PLC; Timothy J. Klima

(57) ABSTRACT

A cooled turbine runner, in particular a high-pressure turbine runner for an aircraft engine, with turbine blades that are radially arranged at a circumferential surface of a rotor disk, wherein respectively one turbine blade with a profiled blade root is inserted into a correspondingly profiled disk finger groove at the circumferential surface of the rotor disk, and wherein a cooling device is provided with at least one cooling air supply channel that extends at least substantially axially and at least over a part of the axial length of the blade root, and with at least one cooling channel that branches off from the same and extends in the interior of the turbine blade up to an outlet opening at its surface. At an inflow side of the blade root, a plug with a cooling air passage is arranged in the cooling air supply channel, wherein the cooling air passage has a geometry that forms a micro-compressor.

8 Claims, 3 Drawing Sheets

Figure 1:
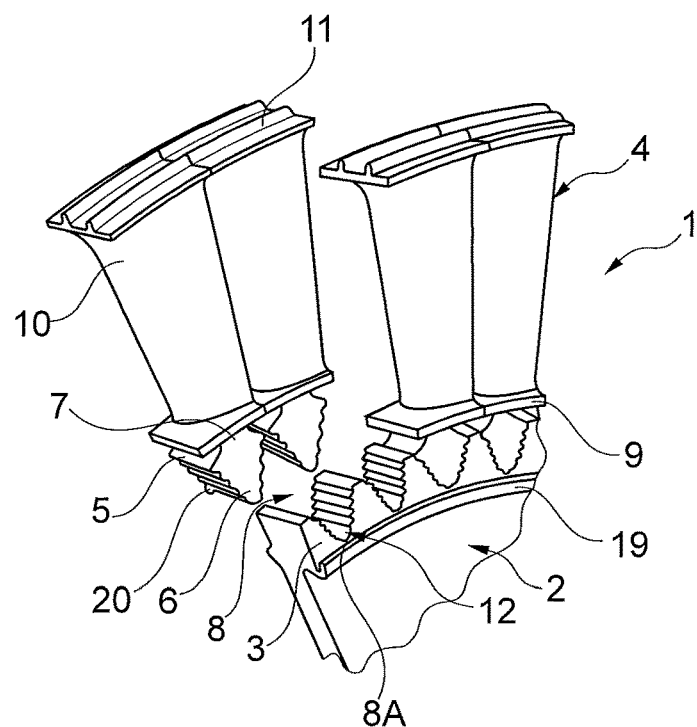

(52) U.S. Cl.
CPC .. *F05D 2220/323* (2013.01); *F05D 2260/201* (2013.01); *F05D 2260/2212* (2013.01); *Y02T 50/673* (2013.01); *Y02T 50/676* (2013.01)

(58) Field of Classification Search
CPC ......... F05D 2220/323; F05D 2260/201; F05D 2260/2212; F05D 2240/81; F05D 2260/20; F05D 2260/202; Y02T 50/673; Y02T 50/676
USPC ........................................................ 416/96 R
See application file for complete search history.

(56) References Cited

U.S. PATENT DOCUMENTS

| | | | | |
|---|---|---|---|---|
| 3,719,431 A * | 3/1973 | Steele et al. | ............ | B23P 15/04 416/193 A |
| 3,778,188 A * | 12/1973 | Aspinwall | ............... | F01D 5/183 416/231 R |
| 3,791,758 A * | 2/1974 | Jenkinson | ............... | F01D 5/081 415/116 |
| 3,940,268 A * | 2/1976 | Catlin | ...................... | B22F 5/00 419/8 |
| 4,008,052 A * | 2/1977 | Vishnevsky | ........... | B22D 19/04 164/100 |
| 4,096,615 A * | 6/1978 | Cross | ................... | B23K 35/304 228/175 |
| 4,152,816 A * | 5/1979 | Ewing | ..................... | B22F 7/062 29/889.2 |
| 4,178,129 A * | 12/1979 | Jenkinson | ............... | F01D 5/081 416/193 A |
| 4,335,997 A * | 6/1982 | Ewing | ..................... | F01D 5/048 416/185 |
| 4,415,310 A * | 11/1983 | Bouiller | ..................... | F02C 7/18 415/115 |
| 4,416,111 A * | 11/1983 | Lenahan | .................... | F02C 7/18 415/115 |
| 4,529,452 A * | 7/1985 | Walker | ........................ | B21J 1/00 148/527 |
| 4,581,300 A * | 4/1986 | Hoppin, III | ............ | B23K 20/00 428/546 |
| 4,650,399 A * | 3/1987 | Craig | ....................... | B23P 15/04 416/193 A |
| 4,680,160 A * | 7/1987 | Helmink | ................... | B22F 3/15 29/889.21 |
| 4,882,902 A * | 11/1989 | Reigel | ..................... | F01D 5/082 60/806 |
| 4,907,947 A * | 3/1990 | Hoppin, III | ........... | C22C 19/056 148/514 |
| 5,061,154 A * | 10/1991 | Kington | .................. | F01D 5/048 29/889 |
| 5,106,266 A * | 4/1992 | Borns | ....................... | F01D 5/28 416/241 R |
| 5,113,583 A * | 5/1992 | Jenkel | ........................ | B21K 3/04 228/193 |
| 5,245,821 A * | 9/1993 | Thomas, Jr. | ............... | F01D 9/02 415/116 |
| 5,431,542 A * | 7/1995 | Weisse | ..................... | F01D 5/323 416/219 R |
| 5,993,162 A * | 11/1999 | Weisse | ..................... | F01D 5/323 416/219 R |
| 6,106,233 A * | 8/2000 | Walker | ............... | B23K 20/1205 416/213 R |
| 6,162,019 A * | 12/2000 | Effinger | ................... | F01D 5/025 416/229 A |
| 6,290,464 B1 * | 9/2001 | Negulescu | ................ | F01D 1/32 416/239 |
| 6,524,072 B1 * | 2/2003 | Brownell | ........... | B23K 20/1205 416/213 R |
| 6,616,408 B1 * | 9/2003 | Meier | .................... | B23K 13/01 416/193 A |
| 6,666,653 B1 * | 12/2003 | Carrier | ................... | F01D 5/3061 29/889.21 |
| 6,735,956 B2 * | 5/2004 | Romani | ................... | F01D 5/081 415/115 |
| 6,969,240 B2 * | 11/2005 | Strangman | ............ | B23P 15/006 415/191 |
| 6,981,845 B2 * | 1/2006 | Balland | ................... | F01D 5/081 416/248 |
| 7,121,797 B2 * | 10/2006 | Negulescu | ............... | F01D 5/081 416/97 R |
| 7,198,466 B2 * | 4/2007 | Townes | ................... | F01D 5/081 416/179 |
| 8,128,365 B2 * | 3/2012 | De Cardenas | .......... | F01D 5/081 416/193 A |
| 8,381,533 B2 * | 2/2013 | Smoke | .................... | F01D 5/081 415/115 |
| 8,821,122 B2 * | 9/2014 | Borufka | ................. | F01D 5/082 415/115 |
| 9,482,094 B2 * | 11/2016 | Justl | ......................... | F01D 5/081 |
| 9,765,629 B2 * | 9/2017 | Justl | ......................... | F01D 5/08 |
| 2005/0152785 A1 * | 7/2005 | McGrath | ................. | F01D 5/187 416/97 R |
| 2006/0168808 A1 * | 8/2006 | Lin | ......................... | B23K 9/044 29/889.1 |
| 2008/0219855 A1 | 9/2008 | Whitton | | |
| 2008/0304974 A1 * | 12/2008 | Marshall | ................... | F01D 5/02 416/223 R |
| 2010/0143140 A1 * | 6/2010 | Guemmer | ................. | F01D 5/143 416/193 A |
| 2010/0178155 A1 * | 7/2010 | Inomata | ................... | F01D 5/08 415/1 |
| 2010/0239430 A1 * | 9/2010 | Gupta | ....................... | F01D 5/14 416/97 R |
| 2012/0279066 A1 * | 11/2012 | Chin | ....................... | B23P 6/007 29/889.1 |
| 2013/0034445 A1 * | 2/2013 | Ram | ......................... | F01D 5/187 416/219 R |
| 2015/0354358 A1 * | 12/2015 | Grande, III | ............... | B22F 3/17 416/241 R |
| 2016/0289855 A1 * | 10/2016 | Task | ......................... | C25D 5/14 |

FOREIGN PATENT DOCUMENTS

| | | | | |
|---|---|---|---|---|
| DE | 10332561 A1 | 1/2005 | | |
| EP | 1004748 A2 | 5/2000 | | |
| EP | 1464792 A1 | 10/2004 | | |
| EP | 1967692 A2 | 9/2008 | | |
| EP | 2075411 A1 * | 7/2009 | ............ | F01D 5/084 |
| GB | 1350471 A * | 4/1974 | ............ | F01D 5/081 |
| GB | 1417132 A * | 12/1975 | ............ | F01D 5/021 |

OTHER PUBLICATIONS

German Search Report dated May 25, 2016 for counterpart German Application No. 10 2015 111 746.0.

* cited by examiner

COOLED TURBINE RUNNER, IN PARTICULAR FOR AN AIRCRAFT ENGINE

This application claims priority to German Patent Application DE102015111746.0 filed Jul. 20, 2015, the entirety of which is incorporated by reference herein.

The invention relates to a cooled turbine runner, in particular a high-pressure turbine runner for an aircraft engine, in which, according to features disclosed herein, a cooling device is provided, with the cooling device comprising at least one cooling air supply channel that extends at least substantially axially and at least across a part of the axial length of a blade root of a turbine blade, and at least one cooling channel that branches off radially therefrom and extends in the interior of the turbine blade up to a discharge opening at its surface.

Turbine runners that are embodied in such a manner are known with different designs of cooling air supply channels, wherein it is referred to DE 103 32 561 A1, EP 1 004 748 B1 and EP 1 464 792 B1, for example.

All these solutions have in common that they aim at providing a maximally effective cooling of the turbine blades with a high-pressure cooling air that is supplied to the turbine runner in order to minimize the thermal load of the turbine blades and to ensure a maximally long service life. As can for example be seen in DE 103 32 561 A1, it is preferred here that the area of the turbine blade intake at the disk rim of the rotor disk of a turbine runner is designed in such a manner that a slit-like cooling air supply channel remains between a blade root of a turbine blade and a finger pane groove present between the disk fingers of the rotor disk, which support the turbine blade, with a cooling air flow being guided through the slit-like cooling air supply channel in the axial direction of the turbine blade and with cooling channels branching off radially from the slit-like cooling air supply channel into a blade profile of a turbine blade.

However, the pressure gradient that is available for an efficient cooling of the turbine blades in the respective blade is considerably reduced due to the high pressure losses at the entrance into the cooling air supply channel in particular if a cooling air flow enters the cooling air supply channel with a turbulence swirl. Hence, there is also a negative impact on the cooling inside the turbine blades and the disk rim. A cooling thus reduced results in a shorter service life of the turbine blade and the entire turbine runner in the engine.

It is an object of the invention to form a cooled turbine runner, in particular for an aircraft engine, of the kind as it has been described above, namely in such a manner that an effective cooling of the turbine blades and of the disk rim and thus a longer service life of the turbine runner can be ensured with less effort, even when a cooling air inflow with a turbulence swirl is present.

The object is achieved with a turbine runner according to the present disclosure.

Thus, what is provided is a cooled turbine runner, in particular a high-pressure turbine runner for an aircraft engine, with turbine blades that are radially arranged at a circumferential surface of a rotor disk, wherein respectively one turbine blade with a profiled blade root is inserted into a correspondingly profiled disk finger groove at the circumferential surface of the rotor disk, and wherein a cooling device is provided with at least one cooling air supply channel that extends at least substantially axially and at least over a part of the axial length of the blade root, and with at least one cooling channel that branches off from the same and extends in the interior of the turbine blade up to an outlet opening at its surface. Here, according to the invention, a plug with a cooling air passage is arranged at the inflow side of the blade root in the cooling air supply channel, wherein the cooling air passage has a geometry that forms a micro-compressor.

The provision of a micro-compressor at the entrance side of the cooling air supply channel has the advantageous effect that an efficient turbine blade cooling without additional pressure losses can be ensured, wherein even a cooling air flow that enters the cooling air channel with a relative turbulence swirl opposite to the rotational direction of the rotor disk is sufficient for a satisfactory cooling of the turbine blades, despite the pressure losses that occur due to the turbulence swirls. The gain in cooling flow stagnation pressure in the cooling air supply channel that can be achieved by means of the invention facilitates an efficient internal cooling of the respective turbine blade, wherein cooling air can also be blown out in areas with a higher counter pressure, which can only be cooled with much difficulty by means of conventional cooling systems. In this way, the service life of the turbine blades and of the rotation disk of the turbine runner can be considerably increased.

In an expedient embodiment of the invention, the cooling air passage has a channel geometry that expands in flow direction in a diffuser-like manner. In this way, a micro-compressor is created in a constructionally simple manner.

The geometric design of the micro-compressor is expediently realized in such a manner, that the aerodynamic entrance surface is optimized in the design point with respect to the relative velocity of the inflow, so that a mostly loss-free inflow into the micro-compressor may take place. The deceleration of the flow velocity that is taking place inside the micro-compressor leads to a steady increase in static pressure, which ultimately leads to a better cooling system.

In the case of an exemplary ratio of 1:2 of the flow-cross section between the entrance into the cooling air supply channel, and thus into the plug that represents a micro-compressor, and the exit from the micro-compressor at its transition to the further course of the substantially axial cooling air supply channel, a constant increase of the turbulence swirl number from e.g. 0.5 to approximately 1 can be achieved, so that a maximally possible gain in cooling flow stagnation pressure is facilitated.

In particular with a view to cooling air that flows in with a turbulence swirl, it can thus be advantageous if the cooling air passage of the plug, and thus the micro-compressor, has a horizontal curvature in the flow direction, wherein a middle axis of the cooling air passage in the area of the entrance of a cooling air flow having a turbulence swirl extends at least approximately so as to be aligned with the cooling air blow direction, which is substantially in the rotational direction of the rotation disk in the circumferential direction of the rotor disk, and wherein the middle axis is oriented substantially in the axial extension of the cooling air supply channel after the curvature in the area of the exit of the cooling air flow from the diffuser-like cooling air passage of the plug.

By means of the curvature, the entrance of the cooling air flow can be designed so as to be flat with respect to the inflow side of the turbine blade and the rotor disk, so that the cooling air flow enters the micro-compressor with as little pressure loss as possible, even if a turbulence swirl is present. It has been shown that, as compared to known cooling systems, a gain in cooling flow stagnation pressure of more than 10% can be achieved in this manner in the cooling air supply channel.

In an advantageous embodiment of the invention, in particular in the case of a curved diffusor geometry, a cross-sectional area A_f of the opening of the cooling air passage at the inflow side of the blade root can at least approximately correspond to the double of the cross-sectional area A_t of a neck cross-section of the cooling air passage in the area of the entrance of a cooling air flow. However, the respective proportions can vary depending on the application case.

The micro-compressor with its positioning inside the deepest radial position of the turbine blade is most effective if the plug with the cooling air passage is formed as an extension of the blade root that extends radially in the direction of the interior of the turbine runner and into the cooling air supply channel and that is arranged axially in front of the branch-off location of a cooling channel of the turbine blade.

However, the invention is not limited to such a positioning of the cooling air supply channel and micro-compressor. The person skilled in the art will make use of the advantages of the invention depending on the application case, also with a higher radial position of the cooling air supply channel and micro-compressor in the turbine blade, for example if the cooling air supply channel is integrated into the turbine blade and the cooling air flow conduction is realized only inside the turbine blade. Here, an arrangement of the cooling air supply channel with the micro-compressor is possible in the entire radial extension area of the blade root up to a blade neck, i.e. a transitional area from the blade root to a platform part of the turbine blade that connects radially outward to that.

In an advantageous further embodiment of a turbine runner according to the invention, the blade root can have a profile that is shaped with a fir-tree-like profile, with the extension being formed, in a tooth-like manner and as one piece, at its bottom side that faces towards the radial interior of the turbine runner.

Such a one-piece structural component can be provided in a constructionally simple manner as a cast part, wherein—depending on the geometry and the manufacturing method that is most advantageous for the given case—the diffuser-like cooling air passage can be cast integrally or inserted by means of cutting processing.

Further, it is also conceivable that the plug or micro-compressor is welded, soldered or otherwise attached to the blade root, or that it forms a separate structural component that is inserted into the cooling air supply channel below the blade root, i.e. radially with respect to the interior of the turbine runner and facing towards a base of the disk finger groove, at the entrance side of the cooling air supply channel and with a suitable axial securing.

In a constructionally simple embodiment of the invention, the cooling air passage can be formed with an open cross-section in an area that faces towards a base of the disk finger groove, and can form, together with the disk finger groove, the flow-cross section for the cooling air flow.

In this case, the disk finger groove is used for forming the cooling air supply channel, so that three of the four lateral surfaces of the spatial diffuser structure of the cooling air passage are formed by the plug or the turbine blade, and one lateral surface is formed by the rotor disk, while for the connecting axial section of the cooling air supply channel three side walls can be formed by the disk fingers and the disk finger groove of the rotor disk and a fourth, radially outer wall is formed by the bottom side of the blade root.

In order to avoid turbulences and pressure loss as the cooling air flow enters the cooling air supply channel and the micro-compressor at the inflow side of the blade root and the rotor disk, it is advantageous if the cooling air flow does not enter via a sharp edge of the work piece but rather via a rounded edge or an edge that is provided with a chamfer. If the disk finger groove is used for forming the cooling air supply channel, its edge—at that end which faces the inflow side—can for example be formed with a radius or a chamfer, either completely or only across the width of the cooling air passage.

According to a further embodiment of the invention, the plug or micro-compressor can also be arranged inside an additional structural component that is arranged, seen in flow direction, in front of the rotor disk and the turbine blades, and in a rotation-proof manner with respect to them, said additional structural component forming an area of the cooling air supply channel. Such a structural component can be an infront-positioned ring, or any other plate element.

Apart from the mentioned combination of features, the features specified in the patent claims as well as the features specified in the following exemplary embodiment are suitable respectively on their own or in any combination with each other to embody the subject matter according to the invention.

Other advantages and embodiment possibilities of the cooled turbine runner according to the invention also follow from the patent claims and the exemplary embodiment that will be described in principle below by referring to the drawing.

Figure 2:
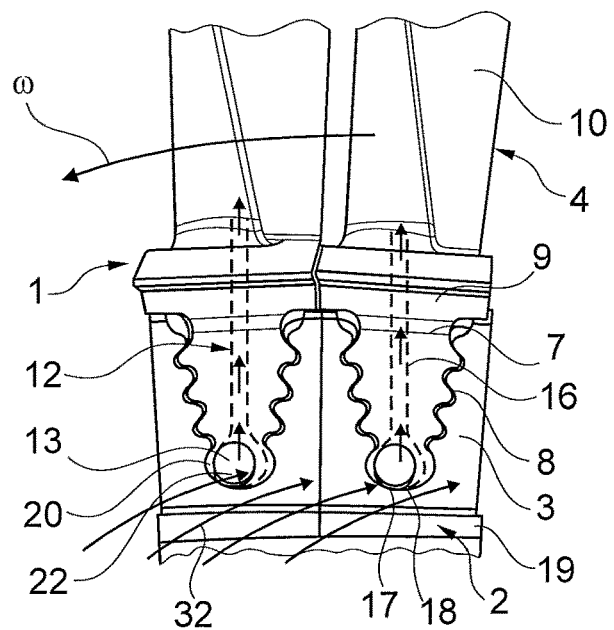
Figure 3:
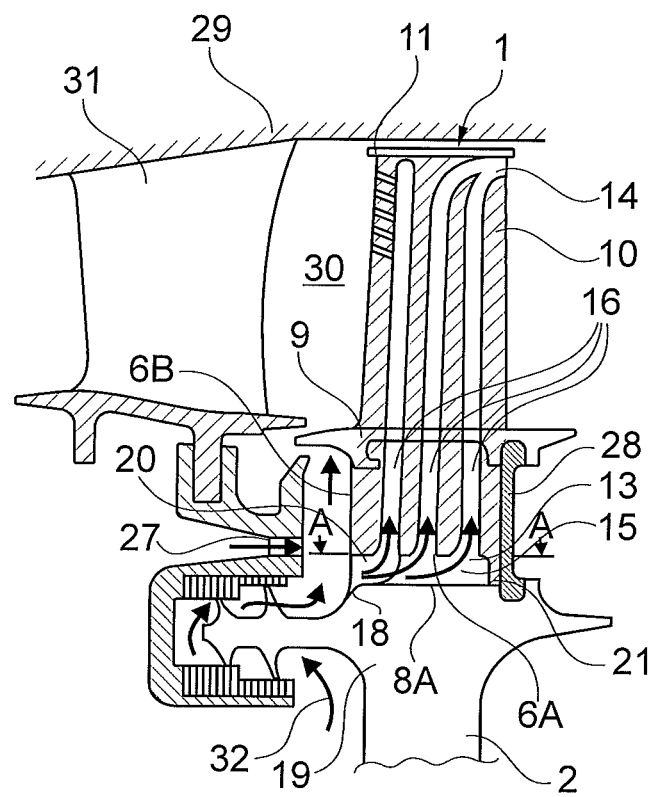
Figure 4:
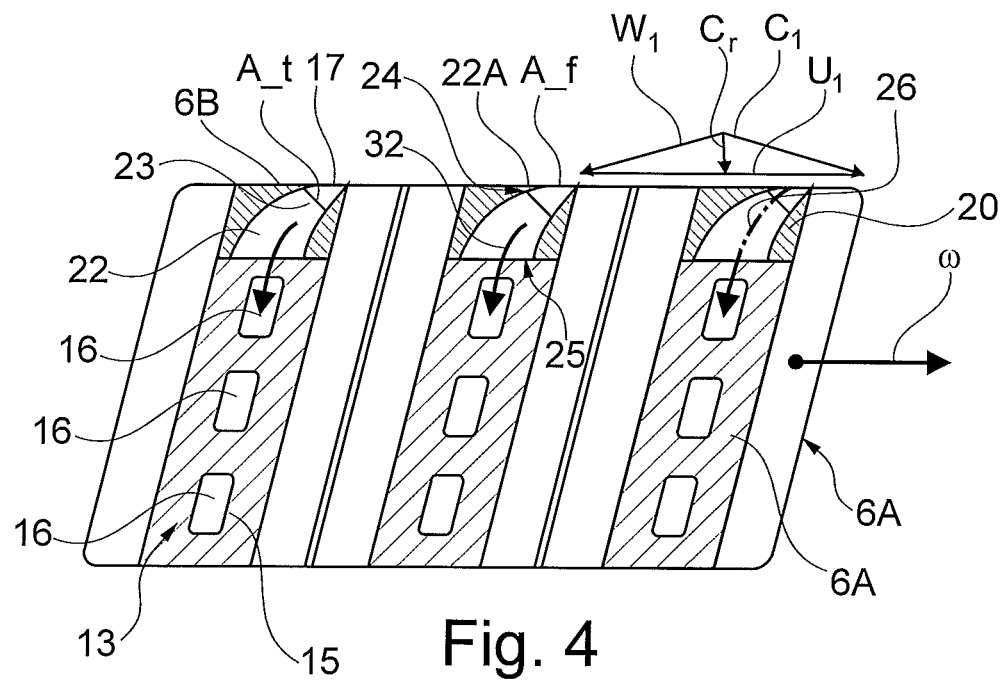
Figure 5:
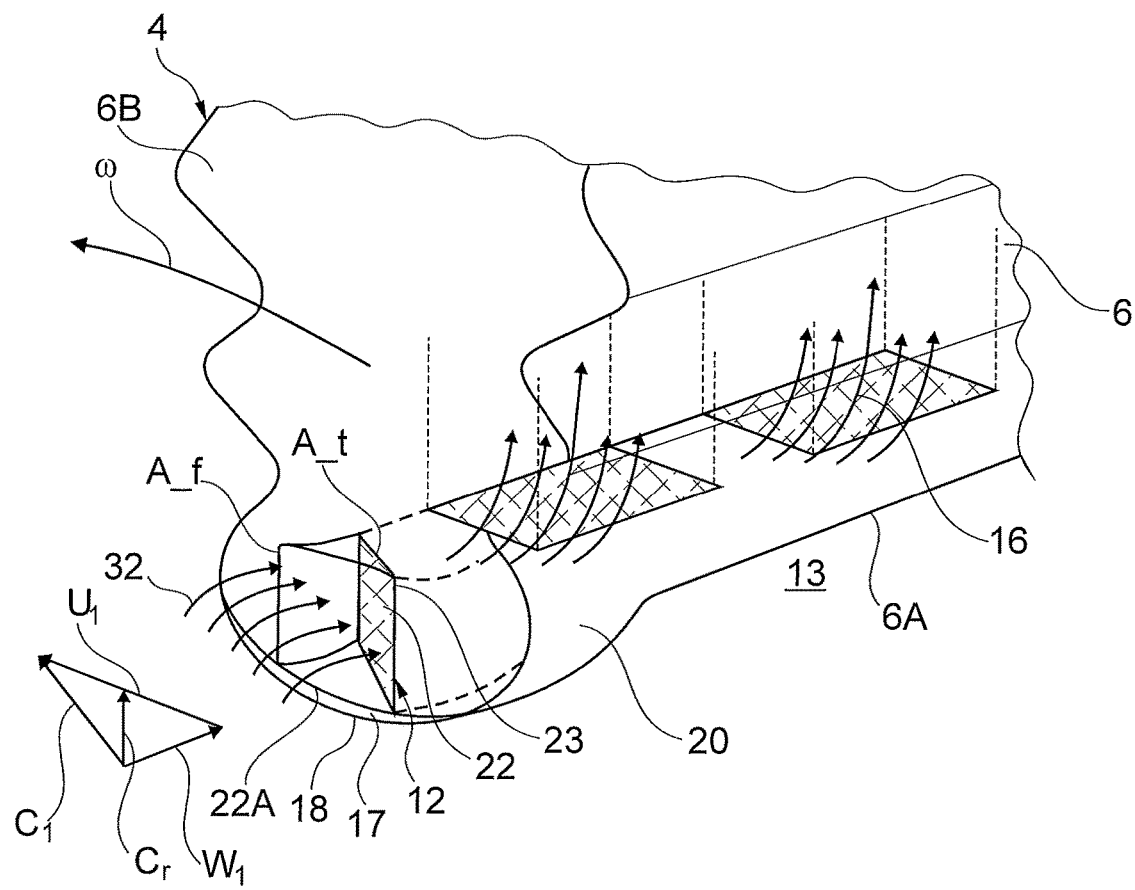

Herein:

FIG. 1 shows a simplified perspective view of a rear area of a cooled turbine runner of an aircraft engine without closing plate embodied according to the invention, FIG. 2 shows a front view of a disk rim area of the turbine runner of FIG. 1, wherein turbine blades that are provided with a cooling device and are held between disk fingers of a rotor disk can be seen partially, FIG. 3 shows a schematized partial longitudinal section through an area of a high-pressure turbine with a guide vane and the turbine runner according to FIG. 1 and FIG. 2, FIG. 4 shows a simplified sectional view along the line A-A in FIG. 3 through the blade roots of three turbine blades that are arranged adjacent to each other, and FIG. 5 shows a perspective schematic sketch of a cooling air flow through a blade root of a turbine blade of FIG. 4.

Referring to FIG. 1 to FIG. 3, respectively different sections of a high-pressure turbine runner 1 for an aircraft engine can be seen, wherein the turbine runner 1 has a rotor disk 2, with profiled disk fingers 3 being formed on its circumferential surface, which is formed by a disk rim.

In the space that remains between the disk fingers 3 and forms a disk finger groove 8, respectively one turbine blade 4 with a blade root 6, which has a fir-tree-shaped profile 5 corresponding to the profiled disk fingers 3, is supported. Connecting radially outward to the blade root 6 of the turbine blade 4 is a blade neck 7, a blade platform 9, a blade profile 10 having a pressure and a suction side, and finally a blade cover band 11. The turbine blades 4 are secured against an axial displacement by a suitably designed closing plate 28 that is attached to the rotor disk 2.

In the interior of the turbine blade 4, there are multiple cooling channels 16 of a cooling device 12 that are impinged by cooling air and that extend from a base 6A of the blade root 6 and lead outward in the radial direction and, where required, additionally also in the transverse direction all the way to the outlet openings 14 at the surface of those areas of the turbine blade 4 that are subjected to heat.

The cooling channels 16 are supplied with cooling air via a cooling air supply channel 13 of the cooling device 12, which extends axially across the largest area of the axial length of the blade root 6, and is formed by the base 6A of the blade root at its radially outer side and by the disk finger groove 8 at its radially inner side.

As can in particular be seen in FIG. 3, in the shown embodiment the turbine runner 1 is a so-called stage II rotor disk of a second stage of a axial-flow high-pressure turbine of an aircraft engine, which is arranged inside an annular channel 30 which is delimited by a housing 29 of the axial turbine and, seen in flow direction, downstream of guide vanes 31 that are attached to the housing 29 of the axial turbine.

Apart from the embodiment that is shown here, the turbine runner 1 with the cooling device 12 can principally be a component part of a high-pressure turbine as well as of a low-pressure turbine. The design of a cooling device 12 shown in the turbine runner 1 can also be used independently of any particular stage position.

In the present exemplary embodiment, a cooling air flow that is indicated by the arrows 32 and that at first passes a sealing ring or a sealing strip 19 at the disk rim of the rotor disk 2 is conveyed inside the annular channel 30 to the front surface or inflow side 6B of the blade root 6 of the turbine blades 4 that faces towards the guide vanes 31, and is introduced into the cooling air supply channel 13, from where it goes via the cooling channels 16 that are branching off radially outwards to the effusion holes or outlet openings 14.

As can be seen from the respective direction of the arrows 32 of the cooling air flow, towards the cooling air supply channel 13 the cooling air flow has a negative turbulence swirl with respect to the rotational direction of the turbine runner 4 that is indicated by arrow ω. In the present case, the negative turbulence swirl flow has a turbulence swirl number of approximately 0.5 in the absolute system before entering the turbine blades 4, which means that in the case of a steady axial orientation of the cooling air supply channel 13 across the entire length of the root of the turbine blade 4 considerable cooling air pressure losses would occur at the entrance to the cooling air supply channel 13 and thus in the entire rotor blade cooling system due to the flow direction that is opposite to the rotational direction ω of the rotation disk 2 and the transverse flow caused by the turbulence swirl.

Additionally or alternatively, the avoidance of such losses can be influenced through the placement of an inlet nozzle 27.

For forming the micro-compressor, the cooling air passage 22, which represents a kind of horizontally curved channel, has a channel geometry that widens in the flow direction like a diffuser. In the present case, the curvature of the cooling air passage 22 inside the plug 20 is selected in such a manner that, in the area of an entrance 24 of the cooling air flow 32 with a turbulence swirl into the cooling air supply channel 13 and the cooling air passage 22 of the plug 20 arranged therein, a middle axis 26 of the cooling air passage 22 is at least approximately aligned with the relative cooling air blow direction, which extends in the circumferential direction of the rotor disk 2 opposite to its rotational direction ω. Thus, the entrance opening of the cooling air flow is designed so as to be flat, i.e. with an acute angle with respect to the inflow side 6A of the blade root 6.

In order to further avoid flow losses and a stall, the disk finger groove 8 is formed with a rounding, i.e. a radius 17, at its front edge 18 at the end that faces towards the inflow side 6B.

At the end of its curvature, the exit 25 of the cooling air flow from the cooling air passage 22 into the connecting area 15 of the cooling air supply channel 13 that extends axially and steadily with an enlarged cross-section is located, wherein in the area of the exit 25 of the cooling air flow, the middle axis 26 of the cooling air passage 22 extends in a substantially coaxial or axially parallel manner to a middle axis of the area 15 of the cooling air supply channel 13 that connects in the axial direction of the turbine blade 4. From this axially connecting area 15 of the cooling air supply channel 13, which is axially delimited at its end that faces away from the plug 20 by a so-called hook 21 that closes the channel cross-section, cooling channels 16 branch off into the interior of the turbine blade 4.

As can be seen in particular in FIGS. 2, 4 and 5, the cooling air passage 22 of the plug 20 is formed so as to deflect and decelerate the cooling air flow guided therein, and thus so as to increase the pressure. With respect to the dimensioning of the diffusor geometry of the cooling air passage 22, in the shown embodiment a cross-sectional area $A\_f$ of an opening 22A of the cooling air passage 22 in the wall of the inflow side 6B of the blade root 6 at least approximately corresponds to the double of the cross-sectional area $A\_t$ of a neck area 23 and thus the smallest cross-sectional surface of the cooling air passage 22 in the area of the entrance 24 of the cooling air flow 32 into the plug 20.

Tests have shown that it is advantageous if, given a maximal width of the plug 20 of 8 mm and a minimal width adjacent to the blade root base 6A of 5 mm, the cooling air passage 22 is designed in such a manner that the cross-sectional area $A\_f$ of the opening 22A in the blade root inflow side 6B has a size of approximately 15 mm$^2$ at a width of 4 mm, while the size of the cross-sectional area $A\_t$ of the neck area 23 is approximately 8 mm$^2$.

Due to the flat cooling air entrance and the corresponding curvature of the cooling air passage 22 already in the area of the entrance 24 of the cooling air flow 32, the cross-sectional surfaces of the opening 22A have a horizontal angle to each other in the blade root inflow side 6B and the neck area 23 of the cooling air passage 22.

The edge 18 and the cooling air passage 22 of the plug 20 are designed threedimensionally in an aerodynamically accurate manner according to the rules of designing high-performance turbo-machines, and together form an efficient micro-compressor with a pressure and a suction side, which—together with the cooling air supply channel 13 that extends axially in its further course and the cooling channels 16 that branch off radially into the blade profile 10—forms an effective micro centrifugal compressor system for cooling the turbine blade 4.

The cooling air flow 32 can have, after having passed the sealing strip 19 at the disk rim and when at the edge 18, a relative velocity w of for example 200 m/s in radially outward direction and in a circumferential direction in the rotational direction ω, and is subject to a pressure increase inside the micro-compressor 20 that is correspondingly designed with respect to aerodynamics, which results in a significant gain in cooling flow stagnation pressure during exit from the plug or micro-compressor. In turn, this excess stagnation pressure ensures an efficient cooling of the turbine blade 4.

In the sectional view of FIG. 4, in which the cooling channels 16 are oriented perpendicular to the section plane and the plane of the base 6A of the blade root 6, as well as in the axonometric view of the blade root area in FIG. 5, the cooling air flow 32 is illustrated in a vectorial manner by means of a velocity triangle. Here, $u_1$ indicates a circumferential speed of each point of the turbine runner 1, $w_1$ the relative velocity of the flow, $c_1$ an absolute velocity of the flow, and $c_r$ its radial component. The latter is approximately 87 m/s, for example, for the relative velocity $w_1$ of 200 m/s that is assumed here.

In the shown exemplary embodiment, the plug 20 with the cooling air passage 22 is embodied as a tooth-like extension of the blade root 6 that extends in the direction of the interior of the turbine runner 1 and into the cooling air supply channel 12. For realizing the shown one-piece embodiment, the plug or micro-compressor 20 is expediently cast together with the turbine blade 4. The integrally cast and/or milled cooling air passage 22 is formed in an area that faces towards a base 8A of the disk finger groove 8 with an open cross-section and thus uses the wall of the disk finger groove 8 on one side for forming the cooling air passage 22.

In addition, an optimal course of flow is ensured through the arrangement of the extension 20 with the cooling air passage 22 at the bottom side of the blade root 6 or in the bottommost cone of the fir tree profile 5 of the blade root 6, and the conduction of the cooling air inside the cooling air passage 22 and the cooling air supply channel 13 in the area of the base 8A of the disk finger groove 8.

PARTS LIST 1 turbine runner
2 rotor disk
3 disk finger
4 turbine blade
5 fir-tree-shaped profile
6 blade root
6A base of blade root
6B inflow side of blade root
7 blade neck
8 disk finger groove
8A base of disk finger groove
9 blade platform
10 blade profile
11 blade cover band
12 cooling device
13 cooling air supply channel
14 diskharge opening
15 area of cooling air supply channel
16 cooling channel
17 radius, rounding
18 edge
19 sealing strip
20 plug, extension
21 hook
22 cooling air passage
22A opening of cooling air passage
23 neck area
24 entrance
25 exit
26 middle axis
27 inlet nozzle
28 closing plate
29 housing
30 annular channel
31 guide vane
32 cooling air flow
A_f cross-sectional area of cooling air passage at inflow-side
A_t cross-sectional area of neck cross-section of the cooling air passage
$c_1$ absolute velocity
$c_r$ radial component
$u_1$ circumferential speed
$w_1$ relative velocity
$\omega$ rotational speed

The invention claimed is:

1. A cooled turbine runner for an aircraft engine, comprising:
a plurality of turbine blades radially arranged at a circumferential surface of a rotor disk,
wherein, at least one of the plurality of turbine blades includes:
an exterior surface;
an interior;
an outlet opening at the exterior surface;
a profiled blade root inserted into a correspondingly profiled disk finger groove at the circumferential surface of the rotor disk,
a cooling device including a cooling air supply channel extending over at least a part of an axial length of the blade root,
a cooling channel branching off from the cooling air supply channel and extending into the interior up to the outlet opening,
a plug with a cooling air passage arranged at an inflow side of the blade root, the cooling air passage including an entrance positioned on and flush with an external circumferential face of the blade root and open to an exterior of the blade root, an exit connecting to the cooling air supply channel and an intermediate portion positioned between the entrance and the exit, wherein an entirety of the cooling air passage downstream of the entrance is positioned within an interior of the blade root, wherein, adjacent to and downstream from the entrance, the intermediate portion is curved, in a plane perpendicular to a longitudinal axis of the blade root, having a flow direction away from a rotation direction of the rotor disk,
wherein the intermediate portion has a cross-sectional area diffusing in the flow direction from the entrance to the exit to form a micro-compressor;
wherein the plug is formed in one piece with the blade root.

2. The turbine runner according to claim 1, wherein the cooling air passage is curved, adjacent the exit, toward an axial direction of the cooling air supply channel.

3. The turbine runner according to claim 1, wherein a cross-sectional area of the cooling air passage at the entrance is double a cross-sectional area of a neck area of the cooling air passage in an area of the entrance.

4. The turbine runner according to claim 1, wherein the plug is an extension of the blade root that extends radially in a direction of the interior of the turbine runner and to the cooling air supply channel and is arranged axially in front of an area of the cooling channel.

5. The turbine runner according to claim 4, wherein the blade root includes a fir-tree profile and the exit faces towards an interior of the turbine runner.

6. The turbine runner according to claim 1, wherein the cooling air passage includes an open cross-section in an area that faces towards a base of the disk finger groove and forms a flow-cross section for a cooling air flow together with the disk finger groove.

7. The turbine runner according to claim 1, wherein the disk finger groove includes an edge that is formed with a radius or a chamfer at an end facing towards an inflow side.

8. The turbine runner according to claim 1, wherein the plug is arranged inside an additional structural component that is arranged in a rotation-proof manner in front of the rotor disk and the turbine blades in a flow direction thereto, and forms an area of the cooling air supply channel.

* * * * *